United States Patent
Yukimatsu et al.

(10) Patent No.: US 10,699,738 B2
(45) Date of Patent: Jun. 30, 2020

(54) BASE FOR MAGNETIC RECORDING MEDIUM, AND HDD

(71) Applicant: SHOWA DENKO K.K., Tokyo (JP)

(72) Inventors: Koji Yukimatsu, Tochigi (JP); Wataru Sato, Tochigi (JP)

(73) Assignee: SHOWA DENKO K.K., Tokyo (JP)

( * ) Notice: Subject to any disclaimer, the term of this patent is extended or adjusted under 35 U.S.C. 154(b) by 213 days.

(21) Appl. No.: 15/835,672

(22) Filed: Dec. 8, 2017

(65) Prior Publication Data

US 2018/0182424 A1 Jun. 28, 2018

(30) Foreign Application Priority Data

Dec. 27, 2016 (JP) .................................. 2016-254327
Dec. 27, 2016 (JP) .................................. 2016-254328
Dec. 27, 2016 (JP) .................................. 2016-254329

(51) Int. Cl.
*G11B 5/73* (2006.01)
*G11B 5/84* (2006.01)
*G11B 5/858* (2006.01)

(52) U.S. Cl.
CPC .......... *G11B 5/7315* (2013.01); *G11B 5/8404* (2013.01); *G11B 5/858* (2013.01)

(58) Field of Classification Search
None
See application file for complete search history.

(56) References Cited

U.S. PATENT DOCUMENTS

| | | | | |
|---|---|---|---|---|
| 5,091,225 A * | 2/1992 | Goto | .................... | G11B 5/7325 427/430.1 |
| 5,153,044 A * | 10/1992 | Chen | .................... | G11B 5/7325 204/192.2 |
| 6,332,906 B1 * | 12/2001 | Haynes | ..................... | B22F 3/20 419/28 |
| 8,404,369 B2 * | 3/2013 | Ruffini | ................... | G11B 5/653 428/832.3 |
| 8,668,953 B1 * | 3/2014 | Buechel-Rimmel | ......................... | G11B 5/7325 427/130 |
| 8,828,482 B1 | 9/2014 | Ruffini et al. | | |
| 2012/0034492 A1 | 2/2012 | Ruffini et al. | | |
| 2014/0072829 A1 * | 3/2014 | Inaba | ....................... | G11B 5/62 428/831.1 |
| 2017/0327930 A1 * | 11/2017 | Kitawaki | ................ | C22C 21/00 |

FOREIGN PATENT DOCUMENTS

| | | |
|---|---|---|
| CN | 102610241 | 7/2012 |
| JP | S61-224118 | 10/1986 |
| JP | 2015-026414 | 2/2015 |

OTHER PUBLICATIONS

Derwent Abstract of WO 2016-068293 A1 (Year: 2016).*

* cited by examiner

*Primary Examiner* — Kevin M Bernatz
(74) *Attorney, Agent, or Firm* — IPUSA, PLLC

(57) ABSTRACT

A base for a magnetic recording medium, includes a substrate made of an Al alloy and having a surface, and a film made of a NiWP-based alloy and plated on the surface of the substrate. The film includes W in a range of 15 mass % to 22 mass %, P in a range of 3 mass % to 10 mass %, and Pb in a range of 0.03 mass % to 0.08 mass %. The film has a thickness of 5 μm or greater.

20 Claims, 4 Drawing Sheets

| | Al Alloy Substrate | | | Electroless Plated film | | Young's Modulus [GPa] |
|---|---|---|---|---|---|---|
| | Composition | Outer Diameter [mm] | Thickness [mm] | Composition | Thickness [μm] | |
| EI1 | Al-Mg4-Mn0.5-Cr0.1-Si0.2-Fe0.3-Zn0.2 | 96 | 0.8 | Ni-W19-P4-Pb0.05 | 10 | 81 |
| EI2 | Al-Mg4-Mn0.5-Cr0.1-Si0.2-Fe0.3-Zn0.2 | 96 | 0.8 | Ni-W22-P3-Pb0.05 | 10 | 82 |
| EI3 | Al-Mg4-Mn0.5-Cr0.1-Si0.2-Fe0.3-Zn0.2 | 96 | 0.8 | Ni-W17-P6-Pb0.05 | 10 | 80 |
| EI4 | Al-Mg4-Mn0.5-Cr0.1-Si0.2-Fe0.3-Zn0.2 | 96 | 0.8 | Ni-W15-P8-Pb0.05 | 10 | 79 |
| EI5 | Al-Mg4-Mn0.5-Cr0.1-Si0.2-Fe0.3-Zn0.2 | 96 | 0.8 | Ni-W19-P4-Pb0.03 | 10 | 81 |
| EI6 | Al-Mg4-Mn0.5-Cr0.1-Si0.2-Fe0.3-Zn0.2 | 96 | 0.8 | Ni-W19-P4-Pb0.08 | 10 | 81 |
| EI7 | Al-Mg4-Mn0.5-Cr0.1-Si0.2-Fe0.3-Zn0.2 | 96 | 0.8 | Ni-W19-P4-Pb0.02 | 10 | 81 |
| EI8 | Al-Mg4-Mn0.5-Cr0.1-Si0.2-Fe0.3-Zn0.2 | 96 | 0.8 | Ni-W19-P4-Pb0.01 | 10 | 80 |
| EI9 | Al-Mg4-Mn0.5-Cr0.1-Si0.2-Fe0.3-Zn0.2 | 96 | 0.8 | Ni-W19-P4 | 10 | 80 |
| CE1 | Al-Mg4-Mn0.5-Cr0.1-Si0.2-Fe0.3-Zn0.2 | 96 | 0.8 | Ni-W14-P9-Pb0.05 | 10 | 78 |
| CE2 | Al-Mg4-Mn0.5-Cr0.1-Si0.2-Fe0.3-Zn0.2 | 96 | 0.8 | Ni-W13-P10-Pb0.05 | 10 | 77 |
| CE3 | Al-Mg4-Mn0.5-Cr0.1-Si0.2-Fe0.3-Zn0.2 | 96 | 0.8 | Ni-P24 | 10 | 75 |
| CE4 | Al-Mg4-Mn0.5-Cr0.1-Si0.2-Fe0.3-Zn0.2 | 96 | 0.8 | Ni-P10-Pb0.05 | 10 | 68 |
| CE5 | Al-Mg4-Mn0.5-Cr0.1-Si0.2-Fe0.3-Zn0.2 | 96 | 0.8 | Ni-P12-Pb0.05 | 10 | 70 |

FIG.3

| | Al Alloy Substrate | | | Electroless Plated film | | Young's Modulus [GPa] |
|---|---|---|---|---|---|---|
| | Composition | Outer Diameter [mm] | Thickness [mm] | Composition | Thickness [μm] | |
| EI1 | Al-Mg4-Mn0.5-Cr0.1-Si0.2-Fe0.3-Zn0.2 | 96 | 0.8 | Ni-W19-P4-Pb0.05 | 10 | 81 |
| EI2 | Al-Mg4-Mn0.5-Cr0.1-Si0.2-Fe0.3-Zn0.2 | 96 | 0.8 | Ni-W22-P3-Pb0.05 | 10 | 82 |
| EI3 | Al-Mg4-Mn0.5-Cr0.1-Si0.2-Fe0.3-Zn0.2 | 96 | 0.8 | Ni-W17-P6-Pb0.05 | 10 | 80 |
| EI4 | Al-Mg4-Mn0.5-Cr0.1-Si0.2-Fe0.3-Zn0.2 | 96 | 0.8 | Ni-W15-P8-Pb0.05 | 10 | 79 |
| EI5 | Al-Mg4-Mn0.5-Cr0.1-Si0.2-Fe0.3-Zn0.2 | 96 | 0.8 | Ni-W19-P4-Pb0.03 | 10 | 81 |
| EI6 | Al-Mg4-Mn0.5-Cr0.1-Si0.2-Fe0.3-Zn0.2 | 96 | 0.8 | Ni-W19-P4-Pb0.08 | 10 | 81 |
| EI7 | Al-Mg4-Mn0.5-Cr0.1-Si0.2-Fe0.3-Zn0.2 | 96 | 0.8 | Ni-W19-P4-Pb0.02 | 10 | 81 |
| EI8 | Al-Mg4-Mn0.5-Cr0.1-Si0.2-Fe0.3-Zn0.2 | 96 | 0.8 | Ni-W19-P4-Pb0.01 | 10 | 80 |
| EI9 | Al-Mg4-Mn0.5-Cr0.1-Si0.2-Fe0.3-Zn0.2 | 96 | 0.8 | Ni-W19-P4 | 10 | 80 |
| CE1 | Al-Mg4-Mn0.5-Cr0.1-Si0.2-Fe0.3-Zn0.2 | 96 | 0.8 | Ni-W14-P9-Pb0.05 | 10 | 78 |
| CE2 | Al-Mg4-Mn0.5-Cr0.1-Si0.2-Fe0.3-Zn0.2 | 96 | 0.8 | Ni-W13-P10-Pb0.05 | 10 | 77 |
| CE3 | Al-Mg4-Mn0.5-Cr0.1-Si0.2-Fe0.3-Zn0.2 | 96 | 0.8 | Ni-P24 | 10 | 75 |
| CE4 | Al-Mg4-Mn0.5-Cr0.1-Si0.2-Fe0.3-Zn0.2 | 96 | 0.8 | Ni-P10-Pb0.05 | 10 | 68 |
| CE5 | Al-Mg4-Mn0.5-Cr0.1-Si0.2-Fe0.3-Zn0.2 | 96 | 0.8 | Ni-P12-Pb0.05 | 10 | 70 |

FIG.4

| | Surface Smoothness | Fluttering [μm] | Warp [μm] | Depth of Cavities [μm] | Surface Density of Cavities [Cavities/mm²] |
|---|---|---|---|---|---|
| EI1 | ◎ | 3.4 | 15 | 10 | 45 |
| EI2 | ◎ | 3.5 | 10 | 8 | 40 |
| EI3 | ◎ | 3.6 | 15 | 12 | 55 |
| EI4 | ◎ | 3.7 | 20 | 20 | 95 |
| EI5 | ○ | 3.4 | 15 | 12 | 65 |
| EI6 | ◎ | 3.4 | 15 | 10 | 55 |
| EI7 | × | 3.4 | 20 | 12 | 60 |
| EI8 | × | 3.5 | 20 | 12 | 65 |
| EI9 | × | 3.5 | 20 | 20 | 100 |
| CE1 | ◎ | 3.8 | 30 | 30 | 145 |
| CE2 | ◎ | 4.0 | 40 | 35 | 170 |
| CE3 | ◎ | 4.9 | 100 | 80 | 340 |
| CE4 | ◎ | 5.0 | 105 | 90 | 370 |
| CE5 | ◎ | 5.0 | 100 | 80 | 400 |

BASE FOR MAGNETIC RECORDING MEDIUM, AND HDD

CROSS-REFERENCE TO RELATED APPLICATIONS

This application is based upon and claims priority to Japanese Patent Application No. 2016-254327 filed on Dec. 27, 2016, Japanese Patent Application No. 2016-254328 filed on Dec. 27, 2016, and Japanese Patent Application No. 2016-254329 filed on Dec. 27, 2016, the entire contents of which are incorporated herein by reference.

BACKGROUND OF THE INVENTION

1. Field of the Invention

The present invention relates to a base for a magnetic recording medium, and a HDD (Hard Disk Drive) having a plurality of magnetic recording media using such a base for the magnetic recording medium.

2. Description of the Related Art

There is demand to considerably improve recording density (or storage capacity) of magnetic recording media that are used in HDDs. Particularly, introduction of a MR (Magneto-Resistive) head and the PRML (Partial Response Maximum Likelihood) technique has further improved in-plane recording density of magnetic recording media.

On the other hand, due to recent developments in the spheres of the Internet and big data utilization, data storage capacities of data centers continue to increase. Due to space limitations at data centers, there are demands to increase storage capacity per unit volume. In other words, in order to increase the storage capacity of one standardized HDD, there are proposals to increase a number of magnetic recording media accommodated within a casing of a standardized HDD.

An Al alloy substrate or a glass substrate is primarily used as a base for magnetic recording media. Compared to glass substrates, Al alloy substrates have a higher toughness and are easier to manufacture, and thus, Al alloy substrates are used for magnetic recording media having a relatively large diameter. A thickness of an Al alloy substrate used for a magnetic recording medium of a 3.5-inch standardized HDD is 1.27 mm, for example.

However, when the thickness of the base used for the magnetic recording medium is reduced in order to increase the number of magnetic recording media that can be accommodated within a casing of the HDD, fluttering more easily occurs in the case in which an Al alloy substrate is used when compared to the case in which a glass substrate is used. Fluttering of a magnetic recording medium occurs when the magnetic recording medium is rotated at a high speed. When fluttering occurs, it becomes difficult to stably read information from the magnetic recording medium within the HDD.

In the case in which a glass substrate is used, for example, the base for the magnetic recording medium is made of a material having a high Young's modulus in order to reduce fluttering, as proposed in Japanese Laid-Open Patent Publication No. 2015-26414, for example.

In addition, there is a proposal to fill the inside of the casing of the 3.5-inch standardized HDD with helium gas in order to reduce fluttering of magnetic recording media. According to this proposal, 6 or more magnetic recording media can be accommodated within the casing, by reducing the thickness of the aluminum alloy substrate.

On the other hand, an assisted recording method has been proposed as a next-generation recording method that can increase the storage capacity per magnetic recording medium and provide a surface recording density on the order of 1 Tbits/inch$^2$. The assisted recording method locally irradiates near-field light, microwave, or the like on the surface of a magnetic recording medium to assist recording, to record information on the magnetic recording medium in a state in which a coercivity of the magnetic recording medium is locally reduced.

The assisted recording method uses a magnetic layer made of $L1_0$ type FePt alloys having a $L1_0$ type crystal structure, $L1_0$ type CoPt alloys having a $L1_0$ type crystal structure, or the like. In order to form such a magnetic layer, the substrate temperature needs to be increased to a temperature of 400° C. or higher.

Generally, the Al alloy substrate is manufactured as follows. First, an Al alloy plate having a thickness on the order of 2 mm or less is formed into a donut-shaped substrate having a desired size by punching. Next, inner and outer peripheral edges of the donut-shaped substrate are chamfered, and data recording surfaces of the donut-shaped substrate are subjected to machining by rotation. Surface roughness and undulation of the data recording surfaces are reduced by grinding using a honing stone. Thereafter, from a viewpoint of providing surface hardness and reducing surface defects, the substrate surfaces are NiP-plated. Next, both substrate surfaces (or data recording surfaces), having the plated NiP film, are subjected to polishing, to form the base for the magnetic recording medium.

For example, Japanese Laid-Open Patent Publication No. 61-224118 proposes a base for the magnetic recording medium, having a plated Ni film that is formed by electroless plating and includes W with a weight ratio of 1% to 20%.

SUMMARY OF THE INVENTION

Embodiments of the present invention can provide a base for a magnetic recording medium, capable of reducing fluttering even when a thickness of the magnetic recording medium is reduced.

According to one aspect of the present invention, a base for a magnetic recording medium includes a substrate made of an Al alloy; and a film made of a NiWP-based alloy and plated on the substrate, wherein the film includes W in a range of 15 mass % to 22 mass %, P in a range of 3 mass % to 10 mass %, and Pb in a range of 0.03 mass % to 0.08 mass %, and wherein the film has a thickness of 5 μm or greater.

According to another aspect of the present invention, a 3.5-inch standardized hard disk drive includes a plurality of magnetic disks; a plurality of heads configured to write information to and read information from the plurality of magnetic disks; and a casing configured to accommodate the plurality of magnetic disks and the plurality of heads, wherein each of the plurality of disks includes a substrate made of an Al alloy and having a surface; a film made of a NiWP-based alloy and plated on the surface of the substrate; and a magnetic layer provided above the surface of the substrate, wherein the film includes W in a range of 15 mass % to 22 mass %, P in a range of 3 mass % to 10 mass %, and Pb in a range of 0.03 mass % to 0.08 mass %, and wherein the film has a thickness of 5 μm or greater.

Other objects and further features of the present invention will be apparent from the following detailed description when read in conjunction with the accompanying drawings.

BRIEF DESCRIPTION OF THE DRAWINGS

FIG. 3 is a diagram illustrating a measured Young's modulus of each base for the magnetic recording medium;

FIG. 4 is a diagram illustrating a machinability (or surface smoothness), fluttering, and heat-resistance of each base for the magnetic recording medium that are evaluated;

DESCRIPTION OF THE PREFERRED EMBODIMENTS

Figure 1:
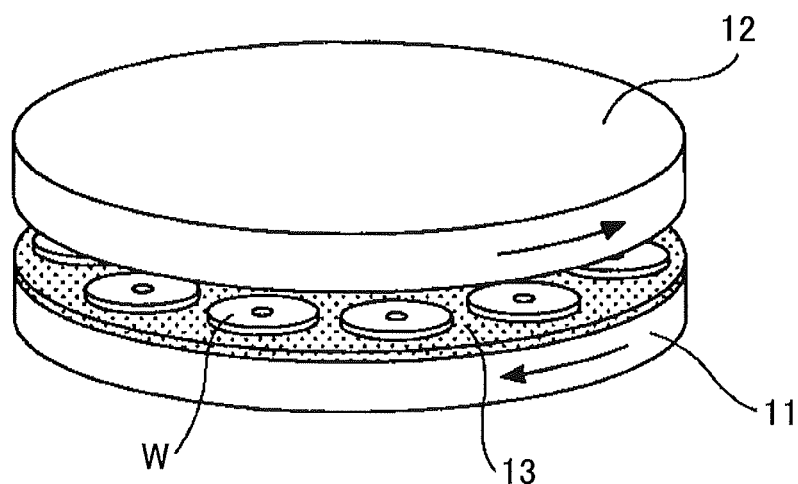
FIG. 1 is a perspective view for explaining an example of a method of manufacturing a base for a magnetic recording medium in accordance with one embodiment of the present invention.

A description will be given of embodiments and exemplary implementations of the base for the magnetic recording medium according to the present invention, by referring to the drawing.

In one embodiment of the present invention, a base for the magnetic recording medium may include a disk-shaped substrate made of an aluminum (Al) alloy and having a center opening at a center thereof, and a film made of a nickel-tungsten-phosphorous (NiWP) alloy plated on a surface of the disk-shaped substrate. The magnetic recording medium using this base may include a magnetic layer, a protection layer, a lubricant layer, or the like that are successively stacked above a surface of the plated NiWP film. A HDD using this magnetic recording medium may include a casing to accommodate this magnetic recording medium, a spindle motor, a magnetic head, or the like. A center part of the magnetic recording medium is mounted on a rotary shaft of the spindle motor, and the magnetic head floats on a surface of the magnetic recording medium that is driven and rotated by the spindle motor. The floating magnetic head writes information to and reads information from the surface of the magnetic recording medium. A pair of magnetic heads may be used to write information to and read information from both surfaces of the magnetic recording medium. In addition, a plurality of magnetic recording media may be accommodated within the casing. The HDD may have a known configuration.

In one embodiment, the plated NiWP film may include W in a range of 15 mass % to 22 mass %, P in a range of 3 mass % to 10 mass %, and lead (Pb) in a range of 0.03 mass % to 0.08 mass %. If the W-content of the plated NiWP film is less than 15 mass %, the heat-resistance of the base for the magnetic recording medium deteriorates, and the Young's modulus decreases. In this case, the fluttering of the magnetic recording medium increases as the thickness of the magnetic recording medium decreases. On the other hand, if the W-content of the plated NiWP film exceeds 22 mass %, the amorphization of the plated NiWP film is inhibited, to deteriorate the machinability of the base. In addition, if the P-content of the plated NiWP film is less than 3 mass %, the amorphization of the plated NiWP film is inhibited, to deteriorate the machinability of the base. On the other hand, if the P-content of the plated NiWP film exceeds 10 mass %, the heat-resistance of the base deteriorates. Further, if the Pb-content of the plated NiWP film is less than 0.03 mass % or exceeds 0.08 mass %, the amorphization of the NiWP film is inhibited, to deteriorate the machinability of the base.

The plated film on the base for the magnetic recording medium is made of a NiP alloy in many cases, however, the head-resistance of the plated NiP film is low, thereby making this base difficult for use in the magnetic recording medium employing the assisted recording method. In other words, a magnetic layer of the magnetic recording medium employing the assisted recording method is made of a $L1_0$ type iron-platinum (FePt) alloy having a $L1_0$ type crystal structure, or a $L1_0$ type cobalt-platinum (CoPt) alloy having a $L1_0$ type crystal structure, however, it is necessary to increase the substrate temperature to 400° C. or higher in order to form such a magnetic layer. At such a high substrate temperature, the crystallization of the plated NiP film may occur, to reduce the volume of the plated NiP film. The reduced volume of the plated NiP film may generate cavities in the plated NiP film, and magnetization of the plated NiP film may occur.

In one embodiment, the W-content of the plated NiWP film is 15 mass % or greater, to increase the heat-resistance and prevent crystallization even when the substrate temperature is increased to 400° C. or higher. For this reason, the cavities are unlikely generated in the plated NiWP film, and the magnetization of the plated NiWP film is unlikely to occur. Even if the thickness of the plated NiWP film is 5 μm or greater, a warp of the base after heating the base for 2 minutes at 450° C. can be reduced to 20 μm or less. Further, even if the thickness of the plated NiWP film is 5 μm or greater, a surface density of cavities having a depth of 5 nm or greater at the surface of the base after heating the base for 2 hours at 400° C. can be reduced to 100 cavities/mm$^2$ or lower.

On the other hand, when the W-content of the plated NiWP film is 15 mass % or greater, the P-content may decrease, and the amorphization of the plated NiWP film may be inhibited. Accordingly, the NiWP film in one embodiment has a Pb-content in a range of 0.03 mass % to 0.08 mass %, and more preferably in a range of 0.04 mass % to 0.07 mass %, so as to promote the amorphization of the plated NiWP film even in a case in which the W-content of the plated NiWP film is 15 mass % or greater. Consequently, defects in the plated NiWP film decrease, and a high-quality base for the magnetic recording medium can be provided.

The plated NiWP film may be plated by a known plating method. For example, the plating method may use a NiP plating solution added with W-salt and Pb-salt.

The W-salt may include sodium tungstate, potassium tungstate, ammonium tungstate, or the like.

The Pb-salt may include lead acetate, lead chloride, lead oxide, or the like.

The plating method is preferably an electroless plating method.

The thickness of the plated NiWP film may be adjusted by an immersion time in the plating solution, a temperature of the plating solution, or the like.

The plating condition is not limited to a particular condition. For example, a plating bath may preferably have a pH of 5.0 to 8.6, and a temperature of 70° C. to 100° C. and more preferably 85° C. to 95° C., and an immersion time of 90 minutes to 150 minutes.

The Al alloy substrate in one embodiment may include a magnesium (Mg) content in a range of 2 mass % to 7 mass % and more preferably 3.5 mass % to 4.5 mass %, a chromium (Cr) content in a range of 0.02 mass % to 0.3 mass % and more preferably 0.05 mass % to 0.25 mass %.

The Al alloy substrate in one embodiment may include, in addition to the added elements Mg and Cr that are added, appropriately added elements that may be appropriately added, inevitable impurities, and Al amounting to the remainder of the Al alloy.

The Al alloy substrate in one embodiment has a high rigidity. In addition, crystal grains forming the Al alloy are micrograins having an average grain diameter of 2 μm or less. Further, the plated NiWP film can be plated uniformly on the Al alloy substrate in one embodiment. Because the machinability of the Al alloy substrate is high, the base for the magnetic recording medium can be provided at a low cost.

Next, a more detailed description will be given of each of the elements added to the Al alloy of the Al alloy substrate.

Mg is solved in an Al alloy matrix and bonds to the added element Cr, to form precipitation that is dispersed within the matrix. As a result, the mechanical properties such as the Young's modulus or the like are improved, and cutting properties of the alloy are further improved due to synergy effect with other solid solution elements. The above described effect is improved when the Mg-content of the Al alloy substrate is 2 mass % or greater. On the other hand, oxidation of Al alloy liquid is reduced and plastic workability improves when the Mg-content of the Al alloy substrate is 7 mass % or less. In addition, the above described effect is improved when the Cr-content of the Al alloy substrate is 0.02 mass % or greater. The enlarging of the crystal grains is reduced when the Cr-content of the Al alloy substrate is 0.3 mass % or less.

The appropriately added elements include silicon (Si), manganese (Mn), Fe, copper (Cu), zinc (Zn), titanium (Ti), Pb, bismuth (Bi), zirconium (Zr), boron (B), vanadium (V), sodium (Na), calcium (Ca), strontium (Sr), or the like.

An added content of each of these appropriately added elements is preferably 1 mass % or less, more preferably 0.5 mass % or less, and still more preferably 0.1 mass % or less. A total amount of the appropriately added elements is preferably 4 mass % or less. When the added content of each of these appropriately added elements is 1 mass % or less, and the total amount of these appropriately added elements is 4 mass % or less, the effect of adding the added elements Mg and Cr improves.

The effect of adding the appropriately added elements to the Al alloy substrate is an improvement of castability (for example, fluidity, shrinkage, and casting-crack resistance), an improvement of mechanical properties, an improvement to machinability (for example, cutting), and an improvement to crystal grain refining, as is generally known for 5000-series aluminum-magnesium alloys.

The Al alloy substrate in one embodiment may be manufactured according to a known method. For example, an Al alloy material with content-adjusted components may be heated and melted, and then subjected to casting, milling, heating and sintering, punching, or the like. A center opening having a prescribed size may be formed at a center of the disk-shaped substrate by the punching.

As described above, the Al alloy substrate in one embodiment may be used for the purposes of increasing the number of magnetic recording media accommodated within a standardized HDD casing. Hence, the Al alloy substrate is preferably accommodatable within the standardized HDD casing, that is, the 2.5-inch HDD casing, the 3.5-inch HDD casing, or the like. A maximum diameter of the substrate used in the 2.5-inch HDD casing is approximately 67 mm, and a maximum diameter of the substrate used in the 3.5-inch HDD casing is approximately 97 mm. Hence, the outer diameter of the Al alloy substrate in one embodiment is preferably 53 mm or greater.

The thickness of the plated NiWP film in one embodiment is 5 μm or greater, and preferably 10 μm or greater. When the thickness of the plated NiWP film is 5 μm or greater, the hardness of the plated NiWP film increases, and the Young's modulus of the base for the magnetic recording medium can be 79 GPa or higher. As a result, even when the base for the magnetic recording medium is made thin, it is possible to reduce the fluttering of the magnetic recording medium.

In one embodiment, the Al alloy substrate after being plated with the plated NiWP film is preferably subjected to a heat treatment. It is possible to further increase the hardness of the plated NiWP film, and further increase the Young's modulus of the base for the magnetic recording medium, by performing the heat treatment. The heat treatment temperature is preferably set to 300° C. or higher.

According to the method of manufacturing the base for the magnetic recording medium in one embodiment, the Al alloy substrate is plated, and the surface of this plated Al alloy substrate is preferably polished thereafter.

In addition, in one embodiment, from a viewpoint of simultaneously improving the surface quality, such as forming a smooth surface and reducing surface damage, and improving the productivity, it is preferable to employ a multi-stage polishing using a plurality of independent grinders and including 2 or more polishing stages. For example, the process of polishing the surface of the plated Al alloy substrate may include a coarse polishing stage that polishes the surface of the plated Al alloy substrate using a first grinder while supplying a polishing agent that includes alumina abrasive grains, and a finishing stage that washes the surface of the plated Al alloy substrate and thereafter finishes the surface of the plated Al alloy substrate using a second grinder while supplying a polishing agent that includes colloidal silica grains.

FIG. 1 is a perspective view for explaining an example of the method of manufacturing the base for the magnetic recording medium in accordance with one embodiment of the present invention.

The first and second grinders may include a pair of tables, namely, upper and lower tables 11 and 12, as illustrated in FIG. 1. The upper and lower tables 11 and 12 rotate in mutually opposite directions as indicated by arrows in FIG. 1, while sandwiching a plurality of bases (that is, the plated Al alloy substrates) W between the upper and lower tables 11 and 12. Both surfaces of each of the bases W are polished by polishing pads 13 provided on the upper and lower tables 11 and 12, respectively.

In one embodiment, the base for the magnetic recording medium is preferably used for a base of a magnetic recording medium having a magnetic layer made of a $L1_0$ type FePt alloy having a $L1_0$ type crystal structure, or a base of a magnetic recording medium having a magnetic layer made of a $L1_0$ type CoPt alloy having a $L1_0$ type crystal structure, or a base of a magnetic recording medium employing the assisted recording method (hereinafter also referred to as an "assisted recording medium").

The assisted recording medium may be manufactured by a known method. For example, a first underlayer having a thickness of 50 nm and made of Co-50 at % Ti (Ti-content of 50 at % and the remainder Co) may be formed on the base of the magnetic recording medium of one embodiment, and thereafter heated to 200° C. Next, a second underlayer having a thickness of 5 nm and made of NiO may be formed on the first underlayer, and thereafter heated to 520° C. Next, a magnetic layer having a thickness of 12 nm and made of (Fe-45 at % Pt-5 at % Ag)-8 mol % $SiO_2$-4 mol % $Cr_2O_3$ ($SiO_2$-content of 8 mol %, $Cr_2O_3$-content of 4 mol %, and the remainder (Pt-content of 45 at %, Ag-content of 5 at %, and the remainder a Fe-alloy) may be formed on the second underlayer. Further, a protection layer having a thickness of 3 nm and made of DLC (Diamond-Like Carbon) may be formed on the magnetic layer.

In the HDD using the assisted recording medium, a center part of the assisted recording medium is mounted on a rotary shaft of a spindle motor, and a magnetic head floats on a surface of the assisted recording medium that is driven and rotated by the spindle motor. The floating magnetic head writes information to and reads information from the surface of the assisted recording medium.

Generally, in the HDD, the magnetic recording medium is rotated at a high speed of 5000 rpm or higher. For this reason, when the magnetic recording medium has poor mechanical properties, fluttering of the magnetic recording medium occurs to make it difficult to stably read information from the magnetic recording medium within the HDD. The present inventors conceived that the fluttering of the magnetic recording medium and the Young's modulus of the magnetic recording medium are interrelated, that is, closely related. The present inventors also conceived that the fluttering can be reduced by increasing the Young's modulus of the magnetic recording medium, and that by setting the Young's modulus of the base for the magnetic recording medium to 79 GPa or higher, it is possible to manufacture a magnetic recording medium having an outer diameter of 53 mm or greater and a thickness of 0.9 mm or less.

Figure 2:
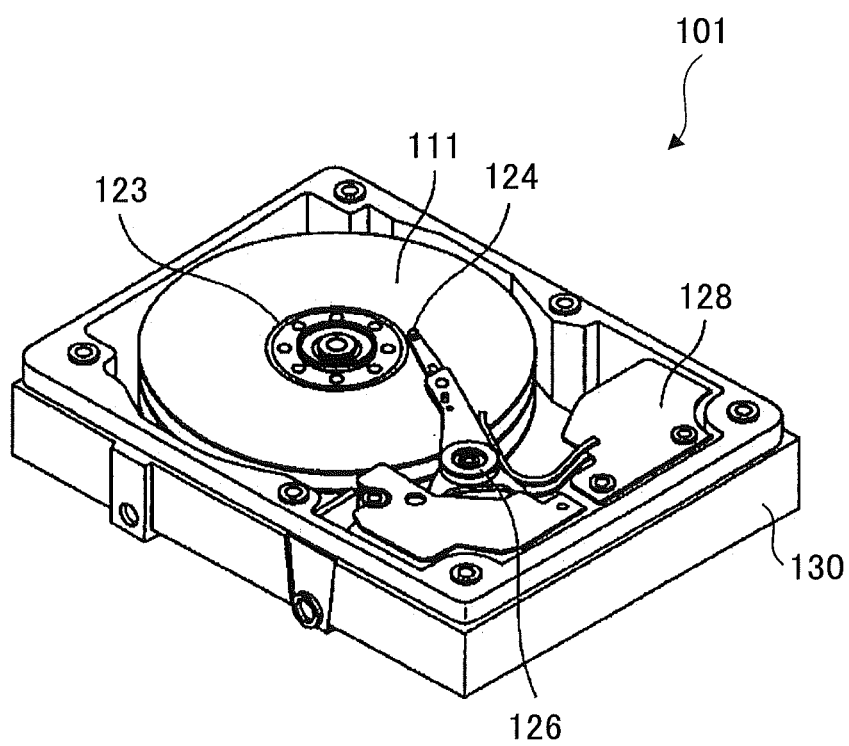
FIG. 2 is a perspective view illustrating an example of a HDD in one embodiment of the present invention.

FIG. 2 is a perspective view illustrating an example of a HDD in one embodiment of the present invention.

A HDD 101 illustrated in FIG. 2 includes a plurality of magnetic recording media 111, a driving mechanism 123 that drives and rotates the magnetic recording media 111 in a recording direction, a plurality of magnetic heads 124, a head moving mechanism 126 that moves the magnetic heads 124 relative to the magnetic recording media 111, and a signal processor 128 that are accommodated within a HDD casing 130. Each magnetic head 124 may include a write part that writes information to a corresponding one of the magnetic recording media 111, and a read part that reads information from the corresponding one of the magnetic recording media 111. The signal processor 128 processes signals that are written to the magnetic recording media 111 by the magnetic heads 124, and signals that are read from the magnetic recording media 111 by the magnetic heads 124.

The base for the magnetic recording medium of one embodiment, used in each magnetic recording medium 111, has a high Young's modulus, to thereby reduce the fluttering. Hence, the base for the magnetic recording medium can be made thin, and it is possible to increase the number of magnetic recording media 111 accommodatable within the standardized HDD casing 130. Accordingly, the HDD 101 that is provided can have a high recording capacity.

In addition, the base for the magnetic recording medium in one embodiment can reduce the fluttering in air, thereby making it unnecessary to encapsulate a low-molecular gas, such as helium gas or the like, inside HDD casing 130. As a result, the manufacturing cost of the HDD 101 having the high recording capacity can be reduced.

The HDD 101 is preferably applied to the 3.5-inch standardized HDD having the high recording capacity.

The existing 3.5-inch standardized HDD may accommodate a maximum of 5 magnetic recording media that use, as the base, an Al alloy substrate having a thickness of 1.27 mm, for example.

On the other hand, the base for the magnetic recording medium in one embodiment has a thickness of 0.9 mm or less. For this reason, it is possible to accommodate 6 or more magnetic recording media 111 in the HDD 101 applied to the 3.5-inch standardized HDD.

Next, a description will be given of exemplary implementations according to the present invention, together with comparison examples.

[Manufacturing Al Alloy Substrate]

A composition-adjusted Al alloy material Al-Mg4-Mn0.5-Cr0.1-Si0.2-Fe0.3-Zn0.2 (Mg-content of 4 mass %, Mn-content of 0.5 mass %, Cr-content of 0.1 mass %, Si-content of 0.2 mass %, Fe-content of 0.3 mass %, Zn-content of 0.2 mass %, and the remainder Al) is used for the Al alloy substrate. The composition-adjusted Al alloy is manufactured by direct-chill casting at a casting rate of 80 mm/minute. A cast ingot that is manufactured from the composition-adjusted Al alloy is held at 520° C. for 10 hours for homogenizing, and is thereafter subjected to rolling to form a plate member having a thickness of 1.2 mm. Then, this plate member is punched into a disk-shaped plate (or substrate) having an outer diameter of 97 mm and a center opening at a center thereof. Top, bottom, and end surfaces of the disk-shaped plate are subjected to machining by rotation using a diamond bit, to form an Al alloy substrate having an outer diameter of 96 mm and a thickness of 0.8 mm.

Exemplary Implementation EI1

(Forming Plated Film by Electroless Plating)

A Ni-W19-P4-Pb0.05 (W-content of 19 mass %, P-content of 4 mass %, Pb-content of 0.05 mass %, and the remainder Ni) film having a thickness of 10 µm is formed on the surface of the Al alloy substrate, as an example of the plated NiWP film.

Nickel sulfate, sodium hypophosphite, sodium tungstate, and lead acetate are used for the plating solution, and sodium citrate and sodium borate are appropriately added to adjust the composition and obtain the plated NiWP film having the adjusted composition. In this example, the plating solution has a pH of 6, the plating temperature is set to 90° C., and the plating time is set to 2 hours. In addition, a heat treatment is performed after the plating at 400° C. for 3 minutes.

(Polishing Process)

A 3-stage lapping machine is used to polish the surface of the Al alloy substrate having the plated NiWP film. The 3-stage lapping machine having a pair of tables, namely, upper and lower tables, is used for the grinder. A suede type pad (manufactured by Filwel Co., Ltd.) is used for polishing pads of the pair of tables of the grinder. Alumina grains having a D50 value of 0.5 µm is used for a first stage of the polishing, colloidal silica grains having a D50 value of 30 nm is used for a second stage of the polishing, and colloidal silica grains having a D50 value of 10 nm is used for a third stage of the polishing. A polishing time for each of the first, second, and third stages of the polishing is 5 minutes.

Exemplary Implementation EI2

The base for the magnetic recording medium is manufactured similarly to that of the exemplary implementation EI1, except that the composition of the plated NiWP film is changed to Ni-W22-P3-Pb0.05.

Exemplary Implementation EI3

The base for the magnetic recording medium is manufactured similarly to that of the exemplary implementation EI1, except that the composition of the plated NiWP film is changed to Ni-W17-P6-Pb0.05.

Exemplary Implementation EI4

The base for the magnetic recording medium is manufactured similarly to that of the exemplary implementation EI1, except that the composition of the plated NiWP film is changed to Ni-W15-P8-Pb0.05.

Exemplary Implementation EI5

The base for the magnetic recording medium is manufactured similarly to that of the exemplary implementation EI1, except that the composition of the plated NiWP film is changed to Ni-W19-P4-Pb0.03.

Exemplary Implementation EI6

The base for the magnetic recording medium is manufactured similarly to that of the exemplary implementation EI1, except that the composition of the plated NiWP film is changed to Ni-W19-P4-Pb0.08.

Exemplary Implementation EI7

The base for the magnetic recording medium is manufactured similarly to that of the exemplary implementation EI1, except that the composition of the plated NiWP film is changed to Ni-W19-P4-Pb0.02.

Exemplary Implementation EI8

The base for the magnetic recording medium is manufactured similarly to that of the exemplary implementation EI1, except that the composition of the plated NiWP film is changed to Ni-W19-P4-Pb0.01.

Exemplary Implementation EI9

The base for the magnetic recording medium is manufactured similarly to that of the exemplary implementation EI1, except that the composition of the plated NiWP film is changed to Ni-W19-P4 (W-content of 19 mass %, P-content of 4 mass %, and the remainder Ni).

Comparison Example CE1

The base for the magnetic recording medium is manufactured similarly to that of the exemplary implementation EI1, except that the composition of the plated NiWP film is changed to Ni-W14-P9-Pb0.05.

Comparison Example CE2

The base for the magnetic recording medium is manufactured similarly to that the exemplary implementation EI1, except that the composition of the plated NiWP film is changed to Ni-W13-P10-Pb0.05.

Comparison Example CE3

The base for the magnetic recording tedium is manufactured similarly to that of the exemplary implementation EI1, except that a plated NiP film having a composition Ni—P24 (P-content of 24 mass %, and the remainder Ni) is used in place of the plated NiWP film. The substrate heating temperature after the plating is changed to 300° C. for this comparison example CE3.

Comparison Example CE4

The base for the magnetic recording medium is manufactured similarly to that of the comparison example CE3, except that the composition of the plated NiP film is changed to Ni-P10-Pb0.05 (P-content of 10 mass %, Pb-content of 0.05 mass %, and the remainder Ni).

Comparison Example CE5

The base for the magnetic recording medium is manufactured similarly to that of the comparison example CE3, except that the composition of the plated NiP film is changed to Ni-P12-Pb0.05 (P-content of 12 mass %, Pb-content of 0.05 mass %, and the remainder Ni).

(Young's Modulus)

Next, the Young's modulus of each base for the magnetic recording medium is measured.

The Young's modulus of each base for the magnetic recording medium, manufactured as described above, is measured by the resonance method, using a Young's modulus measuring device ARC-Y2 manufactured by AGNE Gijutsu Center Inc. FIG. 3 is a diagram illustrating the measured Young's modulus of each base for the magnetic recording medium manufactured according to the exemplary implementations EI1 through EI9 and the comparison examples CE1 through CE5.

Next, the machinability (or surface smoothness), the fluttering, the heat-resistance (that is, the warp, the depth of cavities, and the surface density of the cavities) of each base for the magnetic recording medium are evaluated. FIG. 4 is a diagram illustrating the machinability, fluttering, and heat-resistance of each base for the magnetic recording medium that are evaluated.

(Surface Smoothness)

The surface of each base for the magnetic recording medium is observed by a differential interference optical microscope with a magnification of 1000 times, to evaluate the surface smoothness. The observed surface smoothness of each base for the magnetic recording medium is illustrated as the "Surface Smoothness" in FIG. 4. For the surface smoothness (or evenness) illustrated in FIG. 4, a double circle mark indicates a superior surface smoothness particularly suited for use, a single circle mark indicates a satisfactory surface smoothness suited for use, and a cross mark indicates an unsatisfactory surface smoothness.

Even when the surface smoothness is indicated by the cross mark, the number of stages of the polishing may be increased, and/or the grain diameter of the abrasive grains may be reduced, in order to improve the surface smoothness. In this case, the productivity of the base for the magnetic recording medium may deteriorate.

(Fluttering)

Each base for the magnetic recording medium, manufactured as described above, is rotated at 10000 rpm, and the fluttering occurring at an outermost peripheral surface of each base for the magnetic recording medium is measured using a He—Ne laser displacement gauge. The measured fluttering is illustrated as "Fluttering (μm)" in FIG. 4.

(Warp)

The warp of each base for the magnetic recording medium is measured after heating for 2 minutes at 450° C. under a vacuum environment of $1\times10^{-5}$ Pa. More particularly, after placing each base for the magnetic recording medium on a surface of a table, an optical interference type contactless displacement measuring device measuring device is used to measure a distance from the surface of the table to a highest position of the base, and the warp of each base is measured by subtracting a thickness of each base from the measured distance.

(Depth and Surface Density of Cavities)

A depth (or an average value of the depths) of the cavities generated at the surface of each base for the magnetic recording medium, and the surface density of the cavities after heating each base for 2 hours at 400° C. in air are measured using a laser type wafer defect inspection device. For example, the laser type wafer defect inspection device irradiates a laser beam on each rotating base for the magnetic recording medium, and moves in a radial direction relative to each base, to scan the entire surface of each base by the laser beam. The laser type wafer defect inspection device measures the depth of the cavities generated at the surface of each base, from the reflected light from the base. In this example, the measured depths of 5 nm or greater are counted as the cavities.

The cavities are generated at the surface of each base for the magnetic recording medium due to the reduced volume of the plated NiWP or NiP film, caused by crystallization of the plated NiWP or NiP film.

Figure 5:
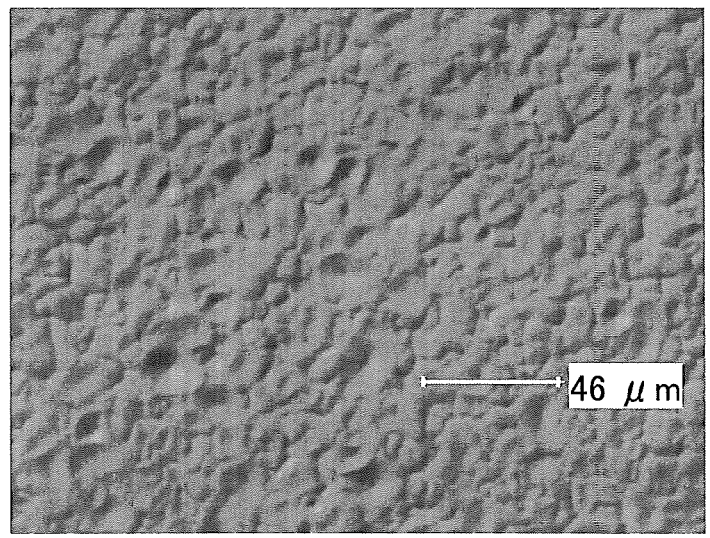
FIG. 5 is a microphotograph of a surface of the base for the magnetic recording medium observed by a differential interference optical microscope in a comparison example CE4.

FIG. 5 is a microphotograph of a surface of the base for the magnetic recording medium observed by a differential interference optical microscope in the comparison example CE4. It may be confirmed from FIG. 5 that the crystallization of the plated NiP film progresses when the base of the comparison example CE4 is heated for 2 hours at 400° C. For this reason, the cavities are generated at the surface of the base for the magnetic recording medium due to the reduced volume of the plated NiP film, caused by crystallization of the plated NiP film.

Figure 6:
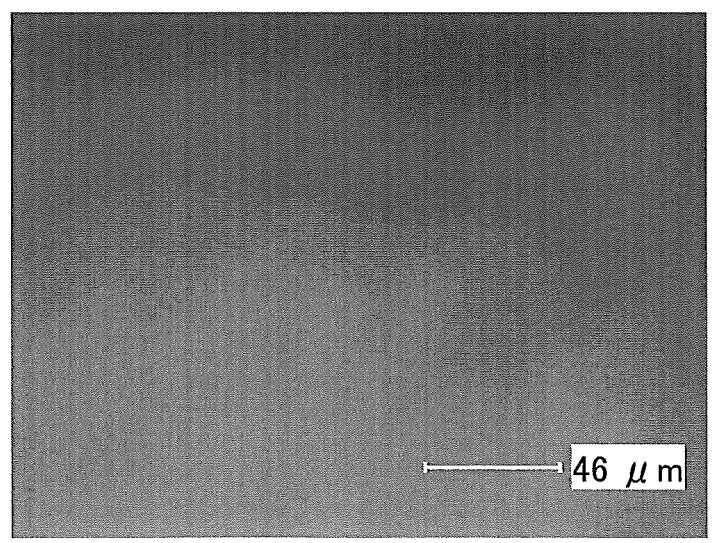
FIG. 6 is a microphotograph of the surface of the base for the magnetic recording medium observed by the differential interference optical microscope in an exemplary implementation EI1.

FIG. 6 is a microphotograph of the surface of the base for the magnetic recording medium observed by the differential interference optical microscope in the exemplary implementation EI1. It may be confirmed from FIG. 6 that the surface smoothness of the plated NiWP film is maintained even when the base of the exemplary implementation EI1 is heated for 2 hours at 400° C.

Evaluation

From FIG. 4, it may be confirmed that the bases for the magnetic recording medium according to the exemplary implementations Eli through EI9 have small fluttering and high heat-resistance, even though these bases are thin.

It may also be confirmed that particularly the bases for the magnetic recording medium according to the exemplary implementations Eli through EI6 have small fluttering, superior machinability (or surface smoothness), and high heat-resistance, even though these bases are thin.

It may be confirmed that, because the Pb-content of the plated NiWP film is 0 mass % to 0.02 mass % in the bases for the magnetic recording medium according to the exemplary implementations EI7 through EI9, the machinability (or surface smoothness) slightly deteriorates when compared to those of the exemplary implementations EI1 through EI6.

On the other hand, it may be confirmed that, because the W-content of the plated NiWP film is 13 mass % to 14 mass % in the bases for the magnetic recording medium according to the comparison examples CE1 and CE2, the heat-resistance deteriorates, the Young's modulus becomes smaller, and the fluttering becomes larger.

In addition, it may be confirmed that, because the plated NiP film is formed in the bases for the magnetic recording medium according to the comparison examples CE3 through CE5, the heat-resistance deteriorates, the Young's modulus becomes smaller, and the fluttering becomes larger.

According to the embodiments and exemplary implementations described above, it is possible to provide a base for a magnetic recording medium, capable of reducing fluttering even when a thickness of the magnetic recording medium is reduced. For this reason, it is possible to increase a number of magnetic recording media that can be accommodated within a casing of a standardized HDD, and provide a high recording capacity (or high storage capacity). In addition, because the Young's modulus of the base is high, the machinability of the base can be improved when manufacturing the magnetic recording medium. Furthermore, it is possible to provide a base for a magnetic recording medium, having a high heat-resistance, and applicable to the assisted recording method.

Although the exemplary implementations are numbered with, for example, "first," "second," "third," etc., the ordinal numbers do not imply priorities of the exemplary implementations.

Further, the present invention is not limited to these embodiments and exemplary implementations, but various variations and modifications may be made without departing from the scope of the present invention.

What is claimed is:

1. A base for a magnetic recording medium, comprising:
   a substrate made of an Al alloy and having a surface; and
   a film made of a NiWP-based alloy and plated on the surface of the substrate,
   wherein the film includes W in a range of 15 mass % to 22 mass %, P in a range of 3 mass % to 10 mass %, and Pb in a range of 0.03 mass % to 0.08 mass %, and
   wherein the film has a thickness of 5 μm or greater.

2. The base for the magnetic recording medium as claimed in claim 1, wherein the substrate includes Mg in a range of 2 mass % to 7 mass %, and Cr in a range of 0.02 mass % to 0.3 mass %.

3. The base for the magnetic recording medium as claimed in claim 1, further comprising:
   a magnetic layer, provided above the surface of the substrate, and made of a $L1_0$ type FePt alloy having a $L1_0$ type crystal structure, or a $L1_0$ type CoPt alloy having a $L1_0$ type crystal structure.

4. The base for the magnetic recording medium as claimed in claim 1, having an outer diameter of 53 mm or greater, a thickness of 0.9 mm or less, and a Young's modulus of 79 GPa or higher.

5. The base for the magnetic recording medium as claimed in claim 1,
   wherein a plurality of cavities are formed at the surface of the substrate after heating the substrate at 400° C. for 2 hours, and
   wherein a surface density of cavities having a depth of 5 nm or greater from the surface of the substrate is 100 cavities/mm$^2$.

6. The base for the magnetic recording medium as claimed in claim 5, wherein the substrate includes Mg in a range of 2 mass % to 7 mass %, and Cr in a range of 0.02 mass % to 0.3 mass %.

7. The base for the magnetic recording medium as claimed in claim 5, further comprising:
a magnetic layer, provided above the surface of the substrate, and made of a $L1_0$ type FePt alloy having a $L1_0$ type crystal structure, or a $L1_0$ type CoPt alloy having a $L1_0$ type crystal structure.

8. The base for the magnetic recording medium as claimed in claim 5, having an outer diameter of 53 mm or greater, a thickness of 0.9 mm or less, and a Young's modulus of 79 GPa or higher.

9. The base for the magnetic recording medium as claimed in claim 1, wherein a warp of the substrate after heating the substrate at 450° C. for 2 minutes is 20 μm or less.

10. The base for the magnetic recording medium as claimed in claim 9, wherein the substrate includes Mg in a range of 2 mass % to 7 mass %, and Cr in a range of 0.02 mass % to 0.3 mass %.

11. The base for the magnetic recording medium as claimed in claim 9, further comprising:
a magnetic layer, provided above the surface of the substrate, and made of a $L1_0$ type FePt alloy having a $L1_0$ type crystal structure, or a $L1_0$ type CoPt alloy having a $L1_0$ type crystal structure.

12. The base for the magnetic recording medium as claimed in claim 9, having an outer diameter of 53 mm or greater, a thickness of 0.9 mm or less, and a Young's modulus of 79 GPa or higher.

13. A 3.5-inch standardized hard disk drive comprising:
a plurality of magnetic disks;
a plurality of heads configured to write information to and read information from the plurality of magnetic disks; and
a casing configured to accommodate the plurality of magnetic disks and the plurality of heads,
wherein each of the plurality of disks, forming a magnetic recording medium, includes:
the base for the magnetic recording medium according to claim 1; and
a magnetic layer provided above the surface of the substrate.

14. The 3.5-inch standardized hard disk drive as claimed in claim 13, wherein the substrate of each of the plurality of magnetic disks includes Mg in a range of 2 mass % to 7 mass %, and Cr in a range of 0.02 mass % to 0.3 mass %.

15. The 3.5-inch standardized hard disk drive as claimed in claim 13, wherein the magnetic layer of each of the plurality of magnetic disks is made of a $L1_0$ type FePt alloy having a $L1_0$ type crystal structure, or a $L1_0$ type CoPt alloy having a $L1_0$ type crystal structure.

16. The 3.5-inch standardized hard disk drive as claimed in claim 13, wherein each of the plurality of magnetic disks has a thickness of 0.9 min or less, and a Young's modulus of 79 GPa or higher.

17. The 3.5-inch standardized hard disk drive as claimed in claim 13,
wherein a plurality of cavities are formed at the surface of the substrate of each of the plurality of magnetic disks after heating the substrate at 400° C. for 2 hours, and
wherein a surface density of cavities having a depth of 5 nm or greater from the surface of the substrate of each of the plurality of magnetic disks is 100 cavities/mm².

18. The 3.5-inch standardized hard disk drive as claimed in claim 13, wherein a warp of the substrate of each of the plurality of magnetic disks after heating the substrate of each of the plurality of magnetic disks at 450° C. for 2 minutes is 20 μm or less.

19. A magnetic recording medium comprising:
the base for the magnetic recording medium according to claim 1; and
a magnetic layer, provided above the surface of the substrate that has a disk shape,
wherein the magnetic layer is made of a $L1_0$ type FePt alloy having a $L1_0$ type crystal structure, or a $L1_0$ type CoPt alloy having a $L1_0$ type crystal structure.

20. A hard disk drive comprising:
the magnetic recording medium according to claim 19 and having a disk shape;
a head configured to write information to and read information from the magnetic recording medium; and
a casing configured to accommodate the magnetic recording medium and the head.

* * * * *